United States Patent [19]

Dequatre et al.

[11] Patent Number: 4,855,337

[45] Date of Patent: Aug. 8, 1989

[54] HETEROGENEOUS POLYMERS

[75] Inventors: Claude Dequatre, Bischheim; Peter R. J. Blanpain, Reichstett, both of France; Michel Longuet, Sarnia, Canada

[73] Assignee: Polysar Financial Services S.A., Canton of Fribourg, Switzerland

[21] Appl. No.: 866,487

[22] Filed: May 23, 1986

[30] Foreign Application Priority Data

Jun. 6, 1985 [FR] France ................ 85 08542

[51] Int. Cl.$^4$ ............................................. C08L 83/00
[52] U.S. Cl. .................................... 523/201; 525/902
[58] Field of Search ........................ 523/201; 525/902

[56] References Cited

U.S. PATENT DOCUMENTS

| 4,086,199 | 4/1978 | Daniel ............................ 523/201 |
| 4,107,120 | 8/1978 | Plamondon et al. . |
| 4,134,872 | 1/1979 | Lee . |
| 4,413,068 | 11/1983 | Sinclair et al. ................... 523/201 |
| 4,477,535 | 10/1984 | Sinclair et al. ................... 525/902 |
| 4,478,974 | 10/1984 | Lee et al. ........................ 525/902 |
| 4,495,324 | 1/1985 | Chacko et al. .................. 525/902 |
| 4,542,179 | 9/1985 | Falk et al. ...................... 525/902 |

FOREIGN PATENT DOCUMENTS

| 893722 | 1/1983 | Belgium . |
| 916340 | 12/1972 | Canada . |
| 1171996 | 7/1984 | Canada ............................ 523/201 |
| 0040419 | 11/1981 | European Pat. Off. . |
| 57-14612 | 1/1982 | Japan ............................. 525/902 |

Primary Examiner—Joseph L. Schofer
Assistant Examiner—N. Sarafin
Attorney, Agent, or Firm—Stevens, Davis, Miller & Mosher

[57] ABSTRACT

Lattices which may be used in paper coating compositions to provide reasonable stiffness and enhanced pick resistance contain heterogeneous particles comprising polymers based on styrene and butadiene and contain in one domain 1 to 20 weight % of an alkenyl nitrile.

2 Claims, No Drawings

HETEROGENEOUS POLYMERS

BACKGROUND OF THE INVENTION

The present invention relates to latices of heterogeneous polymeric particles. Particles of such polymers may have clear and distinct zones of differing polymer structure as in the case of core/shell particles, or particles with an incomplete shell (continents). In some cases there is no distinct sharp dividing line between one polymeric structure and another; rather, there is a continuous gradual change in polymer composition between two loci on a polymeric particle. It is believed that such a gradual change may occur for a number of reasons such as the solubility of monomers in a polymeric particle, or the gradual change in the composition of a monomer increment over time such as going from a high to low styrene content.

In recent years there have been a number of patents directed to latices of heterogeneous polymeric particles. Such polymers have the potential to be tailored to specific end uses. It has been found that latices of polymers having substantially similar bulk compositions may behave in different manners depending upon the structure within the polymer particle.

Belgium Pat. No. 893,722 issued Jan. 3, 1983 in the names of A. R. Sinclair and E. H. Gleason assigned to Polysar International S.A., discloses a latex of a structured particle having a core of about 60 to 40% by volume of the particles comprising 55 to 65 parts by weight of a monovinylaromatic monomer; 45 to 35 parts by weight of a diolefin; 0.5 to 5 parts by weight of an ethylenically unsaturated acid, and 0.5 to 5 parts by weight of a primary amide or N-methylolacrylamide; and a shell comprising 40 to 60% by volume of the particles comprising 75 to 85 parts by weight of a monovinylaromatic monomer, 25 to 15 parts by weight of a conjugated diolefin, 0.5 to 5 parts by weight of an ethylenically unsaturated carboxylic acid and 0.5 to 5 parts by weight of a primary amide or N-methylolacrylamide. Papers coated with such latices have an improved gloss and pick.

European Patent Application No. 0 040,419 in the name of D. I. Lee and T. Mundorf, assigned to The Dow Chemical Company published 25.11.81, also discloses latex of structured polymeric particles. The particles comprise from 20 to 45 parts by weight of a soft domain comprising 25 to 65 weight percent of a monovinylidene aromatic monomer, and from 75 to 35 weight percent of a conjugated diolefin; and from 55 to 80 parts by weight of a hard interpolymer comprising from 70 to 90 weight percent of a monovinylidene aromatic monomer and from 10 to 30 weight % of an aliphatic diene monomer.

U.S. Pat. No. 4,134,872 issued Jan. 16, 1979 in the name of D. I. Lee assigned to the Dow Chemical Company, discloses a similar type of structured polymeric particle except that both the core and the shell contain carboxylic acid monomers.

Rohm & Haas Company have patents covering multi-component structured polymers. Much of this work is directed to polymers consisting mainly of acrylic acid or acrylate esters. Minor components in such systems include grafting agents such as alkyl esters of a,b-ethylenically unsaturated acids, active crosslinking agents such as glycols, or amides, and latent crosslinking agents such as carboxylic acids. Canadian Pat. No. 916,340 issued Dec. 5, 1972 and U.S. Pat. No. 4,107,120 issued Aug. 15, 1978 are representative of such art.

Rhone-Poulenc Industries have patents to latices of grafted copolymer latices for use in the manufacture of non-wovens. The novel component in the Rhone-Poulenc patent is bis(2-chloroethyl) vinylphosphonate. European Patents Nos. 52,562 and 52,561 are representative of this art.

None of the above art contemplates using alkenyl nitriles as a monomer. In the present invention the second domain contains from 1 to 20% of an alkenyl nitrile.

Paper manufacturers are seeking a latex binder which will provide a good balance of properties including good wet and dry pick, and acceptable paper stiffness at a low price. Unfortunately, these desiderata place conflicting demands on the latex manufacturer. To improve stiffness and gloss requires an increase in the so-called hard monomers with a resulting decrease in the soft monomers which give binding and pick properties. At best the latex manufacturer tries to achieve a balance of properties.

Latices used in paper coating generally comprise a "hard" monomer and "soft" monomer. Properties such as gloss and stiffness are attributed to the hard monomers and obtained at the expense of properties associated with soft polymers such as wet and dry pick. It is desirable to provide a polymer which provides a better balance of properties in a paper coating.

SUMMARY OF THE INVENTION

The present invention provides a latex comprising from about 30 to 65 weight % of heterogeneous particles comprising:

(A) from about 25 to 75 weight % of a first domain formed by emulsion polymerization of a monomeric mixture having a bulk composition consisting of:

(i) from about 40 to about 70 weight % of a $C_{8-12}$ vinylaromatic monomer which may be unsubstituted or substituted by a $C_{1-4}$ alkyl, or $C_{1-4}$ alkanol, radical or a chlorine or bromine atom;

(ii) from about 30 to about 50 weight % of a $C_{4-9}$ aliphatic conjugated diolefin;

(iii) from about 0.5 to about 10 weight % of at least one member selected from the group comprising $C_{3-9}$ ethylenically unsaturated carboxylic acids, $C_{3-9}$ ethylenically unsaturated aldehydes, and $C_{1-8}$ alkyl or $C_{1-8}$ alkanol esters of said acids.

(iv) from 0 to about 10 weight % of an amide of the formula

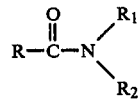

wherein R is an alkenyl radical of up to 7 carbon atoms, $R_1$ may be hydrogen, a $C_{1-4}$ alkyl, or alkanol radical and $R_2$ may be hydrogen or a $C_{1-4}$ alkyl radical; and (B) from about 75 to about 25 weight % of a second domain formed by emulsion polymerization of a monomeric mixture having a bulk composition consisting of (i) from about 45 to 70 weight % of a $C_{8-12}$ vinylaromatic monomer which may be unsubstituted or substituted by a $C_{1-4}$ alkyl, a $C_{1-4}$ alkanol, radical or a chlorine or bromine atom;

(ii) from about 25 to about 40 weight % of a $C_{4-9}$ aliphatic conjugated diolefin;

(iii) from about 0.5 to about 10 weight % of one or more members selected from the group comprising C$_{3-9}$ ethylenically unsaturated carboxylic acids, C$_{3-9}$ ethylenically unsaturated aldehydes, and C$_{1-8}$ alkyl or alkanol esters of said acids;

(iv) from 0 to about 10 weight % of an amide of the formula

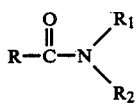

wherein R is an alkenyl radical of up to 7 carbon atoms, R$_1$ may be hydrogen or a C$_{1-4}$ alkyl or alkanol radical and R$_2$ may be hydrogen or a C$_{1-4}$ alkyl radical; and (v) from about 1 to about 20 weight % of an alkenyl nitrile containing up to 6 carbon atoms.

The present invention also provides a free radical emulsion polymerization process which comprises polymerizing an initial portion of the total monomers and subsequently polymerizing an increment portion of the total monomers wherein said initial portion comprises from about 25 to about 75 weight % of the total monomers used and comprises:

(i) from about 40 to about 70 weight % of a C$_{8-12}$ vinylaromatic monomer which may be unsubstituted or substituted by a C$_{1-4}$ alkyl radical, a C$_{1-4}$ alkanol radical, or a chlorine or bromine atom;

(ii) from about 30 to about 50 weight % of a C$_{4-9}$ aliphatic conjugated diolefin;

(iii) from about 0.5 to about 10 weight % of at least one member selected from the group comprising C$_{3-9}$ ethylenically unsaturated carboxylic acid, C$_{3-9}$ ethylenically unsaturated aldehydes and C$_{1-8}$ alkyl or C$_{1-8}$ alkanol esters of said acids;

(iv) from 0 to about 10 weight % of an amide of the formula

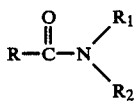

wherein R is an alkenyl radical of up to 7 carbon atoms, R$_1$ may be hydrogen, a C$_{1-4}$ alkyl or a C$_{1-4}$ alkanol radical, and R$_2$ may be hydrogen or a C$_{1-4}$ alkyl radical; and said increment comprises from about 75 to about 25 weight % of the total monomers used and comprises (i) from about 45 to 70 weight % of a C$_{8-12}$ vinylaromatic monomer which may be unsubstituted or substituted by a C$_{1-4}$ alkyl radical, a C$_{1-4}$ alkanol radical, or a chlorine or bromine atom;

(ii) from about 25 to 40 weight % of a C$_{4-9}$ aliphatic conjugated diolefin;

(iii) from about 0.5 to about 10 weight % of one or more members selected from the group comprising C$_{3-9}$ ethylenically unsaturated carboxylic acids, C$_{3-9}$ ethylenically unsaturated aldehydes, and C$_{1-8}$ alkyl and alkanol esters of said acids;

(iv) from about 0 to about 10 weight % of an amide of the formula

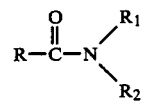

wherein R is an alkenyl radical of up to 7 carbon atoms, R$_1$ may be hydrogen, or a C$_{1-4}$ alkyl or alkanol radical, and R$_2$ may be hydrogen or a C$_{1-4}$ alkyl radical; and (v) from about 1 to 20 weight % of an alkenyl nitrile containing up to 6 carbon atoms.

The present invention also provides a method of manufacturing a coated paper wherein the paper is coated with a composition comprising per 100 parts by weight of a pigment from about 5 to 25 parts by weight of polymeric solids of a latex, the improvement comprising a latex as above.

The present invention also provides a heterogeneous polymer comprising from about 25 to 75 weight % of a first domain formed by the emulsion polymerization of a monomeric mixture having a bulk composition consisting of:

(i) from about 40 to about 70 weight % of a C$_{8-12}$ vinylaromatic monomer which may be unsubstituted or substituted by a C$_{1-4}$ alkyl or alkanol radical or a chlorine or bromine atom;

(ii) from about 30 to about 50 weight % of a C$_{4-9}$ aliphatic conjugated diolefin;

(iii) from about 0.5 to about 10 weight % of at least one member selected from the group comprising C$_{3-9}$ ethylenically unsaturated carboxylic acids, C$_{3-9}$ ethylenically unsaturated aldehydes, and C$_{1-8}$ alkyl or C$_{1-8}$ alkanol esters of said acids; and (iv) from 0 to about 10 weight % of an amide of the formula

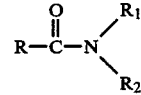

wherein R is an alkenyl radical of up to 7 carbon atoms, R$_1$ may be hydrogen, a C$_{1-4}$ alkyl or alkanol radical and R$_2$ may be hydrogen or a C$_{1-4}$ alkyl radical; and from about 75 to 25 weight % of a second domain formed by the emulsion polymerization of a monomeric mixture having a bulk composition consisting of:

(i) from about 45 to 70 weight % of a C$_{8-12}$ vinylaromatic monomer which may be unsubstituted or substituted by a C$_{1-4}$ alkyl or alkanol radical, or a chlorine or bromine atom;

(ii) from about 25 to 40 weight % of a C$_{4-9}$ aliphatic conjugated diolefin;

(iii) from about 0.5 to about 10 weight % of one or more members selected from the group comprising C$_{3-9}$ ethylenically unsaturated carboxylic acids, C$_{3-9}$ ethylenically unsaturated aldehydes, and C$_{1-8}$ alkyl or alkanol esters of said acids;

(iv) from 0 to about 10 weight % of an amide of the formula

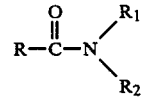

wherein R is an alkenyl radical of up to 7 carbon atoms, $R_1$ may be hydrogen or a $C_{1-4}$ alkyl or alkanol radical and $R_2$ may be hydrogen or a $C_{1-4}$ alkyl radical; and (v) from about 1 to about 20 weight % of an alkenyl nitrile containing up to 6 carbon atoms.

DETAILED DESCRIPTION OF THE INVENTION

As used in the specification and claims the term domain refers to an area of the heterogeneous polymer particle polymerized from a monomer emulsion having a composition significantly different from the monomer emulsion(s) polymerized to form other domain(s) in the heterogeneous particle. As noted earlier in the specification, there may be instances where there is no clear dividing line between the polymeric compositions of one domain and another domain. Rather, there is a gradual transition in polymer composition from one domain to another. It is intended that the term be applicable to this situation as well as those where there is a relatively clear division such as a core/shell or continent situation. In the latex of the present invention the particles comprise from about 25 to 75% by weight of an initial domain and from about 75 to 25% by weight of a subsequent domain. Preferably the weight ratio of initial domain to subsequent domain ranges from about 35:65 to about 65:35, most preferably from about 40:60 to 60:40.

The initial domain is formed by the emulsion polymerization of a monomeric mixture comprising:

(i) from about 40 to about 70 weight % of a $C_{8-12}$ vinylaromatic monomer which may be unsubstituted or substituted by a $C_{1-4}$ alkyl radical, a $C_{1-4}$ alkanol radical or a chlorine or bromine atom.

(ii) from about 30 to about 50 weight % of a $C_{4-9}$ aliphatic conjugated diolefin.

(iii) from about 0.5 to about 10 weight % of at least one member selected from the group $C_{3-9}$ ethylenically unsaturated carboxylic acids, $C_{3-9}$ ethylenically unsaturated aldehydes, and $C_{1-8}$ alkyl or $C_{1-8}$ alkanol esters of said acid; and (iv) from 0 to about 10 weight % of an amide of the formula

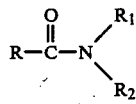

wherein R is an alkenyl radical of up to 7 carbon atoms, $R_1$ may be hydrogen, a $C_{1-4}$ alkyl or alkanol radical and $R_2$ may be hydrogen or a $C_{1-4}$ alkyl radical.

Preferably the vinylaromatic monomer is present in the emulsion forming the first domain in an amount from about 45 to about 60 weight %. Preferably the conjugated diolefin is present in the emulsion forming the first domain in an amount from about 35 to about 55 weight %. Preferably the acid, aldehyde or ester monomer or monomer combination is present in the emulsion forming the first domain in an amount from about 0.5 to 5 weight %. It should be noted that this weight % range may consist of an acid, aldehydes, or ester individually or a mixed blend such as acids-aldehydes, acids-esters, aldehydes-esters, or a blend of acids-aldehydes-esters.

The amide is optionally present in the emulsion forming the first domain. It may, however, be used in amounts up to about 10 weight %. If present, the amide is preferably used in an amount from about 2 to about 5 weight %.

Suitable vinylaromatic monomers are well known to those skilled in the art and include styrene, a-methylstyrene, p-methylstyrene, chlorostyrene, bromostyrene, vinyl toluene, allyl toluene, divinyl benzene, vinyl pyridine, vinylnaphthalene, and t-butylstyrene. The most common monomers in this class are styrene, a-methylstyrene, p-methylstyrene, chlorostyrene, and bromostyrene.

Suitable conjugated diolefins include butadiene, pentadiene, isoprene, hexadiene, heptadiene, octadiene, and nonadiene. The preferred diolefins are butadiene and isoprene.

The acid, aldehyde and ester monomers are well known in the art. Suitable acid monomers include acrylic acid, methacrylic acid, butenoic acid, vinylacetic acid, fumaric acid, pentanoic acid, allylacetic acid, mesaconic acid, citraconic acid, vinyl acrylic acid, hexenoic acid, heptenoic acid, itaconic acid, octanoic acid, nonenoic acid and cinnamic acid. The ester monomers may be $C_{1-8}$ alkyl or alkanol derivatives of such acids and include lower alkyl acrylates and methacrylates such as butylacrylate and butylmethacrylate, hydroxyethyl acrylate, hydroxyethyl methacrylate, ethylhexyl acrylate and ethylhexyl methacrylate. Suitable aldehydes include acrolein, methacrolein, pentenal, B-methylcrotonaldehyde, hexenal, isopropylacrolein, heptanal, octenal, ethyl-hexenal, and nonenal. The most common of the above monomers include acrylic, methacrylic, fumaric, itaconic and cinnamic acids, and their lower alkyl or alkanol esters, and acrolein, methacrolein, and cinnamaldehyde.

If present the amide may be selected from those including acrylamide, methacrylamide, vinylacetamide, N-methyl methacrylamide, N-isopropyl acrylamide, N-methylol acrylamide, and N-methylol methacrylamide. Preferred amides include acrylamide, methacrylamide, N-methylol acrylamide, N-methylol methacrylamide.

In the second domain the vinylaromatic monomers, the conjugated diolefin monomers, the acid, aldehyde, and ester monomers and the amide monomer, if present, may be selected from the same groups of monomers as those for the monomers of the first domain. This does not mean that it is necessary to use the same vinylaromatic monomer, diolefin monomer, acid, aldehyde, ester monomer and amide monomer (if present) in the first and second domain. In fact, it may be desirable to use different monomers within the same broad generic class in the first and second domain. This is particularly true for the functional monomers such as the acid, aldehyde, ester and amide monomers. This is also applicable to the diolefin monomers and the vinylaromatic monomers. For example, a first domain could contain divinyl benzene and butadiene and the second domain could contain p-methyl styrene and isoprene.

In the second domain, the amide monomer is optional as in the first domain. The second domain contains, in addition to the foregoing monomers, an alkenylnitrile containing up to 6 carbon atoms. Suitable nitriles include acrylonitrile, butene nitrile, and pentene nitrile. The preferred nitrile is acrylonitrile.

The ratio of the various monomers used in the second domain differs from the ratio of the monomers used in the first domain. The second domain comprises from about 75 to 25 weight %, preferably from about 60 to 40 weight % of the heterogeneous polymeric particles.

The second domain is formed by polymerizing a monomeric mixture comprising (i) from about 45 to 70 weight % of a $C_{8-12}$ vinylaromatic monomer as described above;

(ii) from about 25 to 40 weight % of a $C_{4-9}$ conjugated diolefin as described above;

(iii) from about 0.5 to 10 weight % of the above described acid, aldehyde, and ester monomers;

(iv) from 0 to about 10 weight % of the above described amides; and (v) from about 1 to 20 weight % of an alkenyl-nitrile containing up to 6 carbon atoms.

Preferably the vinylaromatic monomer is present in the monomer emulsion forming the second domain in an amount from about 45 to 60 weight %.

Preferably the conjugated diolefin is present in the monomer emulsion forming the second domain in an amount from about 30 to 40 weight %.

Preferably the acid, aldehyde, ketone monomer is present in the monomer composition forming the second domain in an amount from about 0.5 to 5 weight %.

Preferably the amide is present in the monomer emulsion forming the second domain in an amount from about 0.5 to 5 weight per cent.

The alkenyl nitrile is present in the emulsion forming the second domain in an amount from about 1 to 20 weight %; preferably it is used in amounts from about 1 to 10 weight %; most preferably from about 3 to 8 weight %.

The latices of the present invention may be prepared using conventional techniques and reagents for an emulsion polymerization system. The monomer emulsion may be stabilized with anionic or nonionic emulsifier, or a mixture of both. The polymerization may be initiated chemically by an initiation system or by heating the emulsion to the decomposition point of a free radical generating catalyst. The free radical catalyst may be a peroxide catalyst such as t-butyl peroxide, hydrogen peroxide, cumene hydroperoxide, or it may be a persulfate catalyst. The catalyst should be water soluble and is generally used in an amount from 0.05 up to about 5 weight % based on the total monomers. The emulsion may contain from about 0.05 to about 5 weight % of known chain transfer agents such as carbon tetrachloride or t-dodecyl mercaptan. Additionally, small amounts of electrolyte may be included in the emulsion. The techniques for emulsion polymerization are well known in the art and are generally disclosed in a number of texts including Synthetic Rubber, edited by G. S. Whitby, John Wiley & Sons Inc., New York, 1954;

High Polymer Latices, D. C. Blackley, Maclaren & Sons Ltd., London, 1966; and

Emulsion Polymerization, I. Piitma, Academic Press, 1982.

It is generally preferred to conduct the polymerization without stopping the reaction between the addition of the emulsions forming the first and second domains. In this way the catalyst in the emulsion forming the first domain is also used in the polymerization of the second domain. It may be desirable to add small amounts of additional catalyst to the emulsion forming the second domain, usually not more than about 1.5 parts by weight per 100 parts by weight of monomers.

There are a number of processes which may be used to prepare heterogeneous polymers formed from monomer emulsions having different compositions. A seed process could be used where the seed is polymerized first and forms the first domain and the second domain is polymerized in the presence of the seed. The first and second domain could be polymerized by a batch process. It is also possible to use an incremental process where a small portion of an emulsion is polymerized and then an incremental monomer composition which may be a fixed or changing composition is added during the polymerization. The first of the second domain or both could be prepared by such a process. If desired the increment composition could be changed during polymerization to provide a heterogeneous polymer particle using a variable feed process.

In the process the emulsion forming the first domain may be polymerized to completion prior to the addition of the emulsion forming the second domain. It may be desirable to start the addition of monomer emulsion forming the second domain at less than substantially complete conversion of the monomer mixture forming the first domain. For example, the addition of the emulsion forming the second domain may be added at about 60% preferably from about 75 to 90% conversion of the monomer emulsion forming the first domain. The emulsion is usually polymerized to a desired solids level, usually from about 50 to 55%, but may, if required be subsequently concentrated to a higher solids level.

Conventional biocides may be added to the latex to prevent the growth of bacteria in the latex prior to its use.

While the inventors were primarily interested in the application of latex in the commercial field, it must be recognized that the latex may be subject to conventional coagulation and drying procedures to produce a polymer comprising from about 25 to 75 weight % of a first domain formed by the emulsion polymerization of a monomeric mixture having a bulk composition consisting of:

(i) from about 40 to about 70 weight % of a $C_{8-12}$ vinylaromatic monomer which may be unsubstituted or substituted by a $C_{1-4}$ alkyl or alkanol radical or a chlorine or bromine atom;

(ii) from about 30 to about 50 weight % of a $C_{4-9}$ aliphatic conjugated diolefin;

(iii) from about 0.5 to about 10 weight % of at least one member selected from the group comprising $C_{3-9}$ ethylenically unsaturated carboxylic acids, $C_{3-9}$ ethylenically unsaturated aldehydes, and $C_{1-8}$ alkyl or $C_{1-8}$ alkanol esters of said acids; and (iv) from 0 to about 10 weight % of an amide of the formula

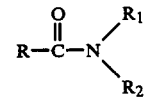

wherein R is an alkenyl radical of up to 7 carbon atoms, $R_1$ may be hydrogen, a $C_{1-4}$ alkyl or alkanol radical and $R_2$ may be hydrogen or a $C_{1-4}$ alkyl radical; and from about 75 to 25 weight % of a second domain formed by the emulsion polymerization of a monomeric mixture having a bulk composition consisting of:

(i) from about 45 to 70 weight % of a $C_{8-12}$ vinylaromatic monomer which may be unsubstituted or substituted by a $C_{1-4}$ alkyl or alkanol radical, or a chlorine or bromine atom;

(ii) from about 25 to 40 weight % of a $C_{4-9}$ aliphatic conjugated diolefin;

(iii) from about 0.5 to about 10 weight % of one or more members selected from the group comprising $C_{3-9}$ ethylenically unsaturated carboxylic acids, $C_{3-9}$ ethylenically unsaturated aldehydes, and $C_{1-8}$ alkyl or alkanol esters of said acids;

(iv) from 0 to about 10 weight % of an amide of the formula

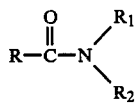

wherein R is an alkenyl radical of up to 7 carbon atoms, $R_1$ may be hydrogen or a $C_{1-4}$ alkyl or alkanol radical and $R_2$ may be hydrogen or a $C_{1-4}$ alkyl radical; and (v) from about 1 to about 20 weight % of an alkenyl nitrile containing up to 6 carbon atoms.

When the latex is used in conventional applications, it is useful in the art of coating paper. In coating paper the latex is compounded with fillers and other conventional additives such as co-binders and water retention aids. The paper coating compound may contain an additional dispersant, compatible with the latex, to disperse the filler. The weight ratio of filler to polymeric solids in the latex is usually in the range 100:25 to about 100:10 but may range as low as 100:5.

Paper stock is then coated with the resulting compound and dried and callandered to produce a product having acceptable gloss and stiffness with enhanced pick resistance.

The following examples are intended to illustrate the scope of the invention and are not intended as limiting. In the examples, "parts" refers to parts by weight.

Experimental Latex A was prepared by the incremental polymerization of the following monomeric compositions:

| Monomer composition of the initial domain: | |
|---|---|
| Styrene | 60 parts |
| Butadiene | 37.5 parts |
| $C_5$ ethylenically unsaturated acids | 2.5 parts |

After substantial polymerization of the initial domain an equal monomeric increment was added comprising:

| | |
|---|---|
| Styrene | 52.0 parts |
| Butadiene | 31.5 parts |
| A mixture of $C_3$ and $C_5$ ethylenically unsaturated acids | 3.5 parts |
| N—methylolacrylamide | 5 parts |
| Acrylonitrile | 8 parts |

The resulting latex was stripped of residual monomer.

Experimental Latex B was prepared by the incremental polymerization of the following monomer compositions:

| Monomer composition of the initial domain: | |
|---|---|
| Styrene | 47.8 parts |
| Butadiene | 46.7 parts |
| $C_5$ ethylenically unsaturated acid | 3.1 parts |
| N-methylolacrylamide | 3.0 parts |

After substantial polymerization of the heel an equal monomeric increment was added comprising:

| | |
|---|---|
| Styrene | 52.0 parts |
| Butadiene | 33.5 parts |
| A mixture of $C_3$ and $C_5$ ethylenically unsaturated acids | 2.9 parts |
| N—methylolacrylamide | 3.0 parts |
| Acrylonitrile | 8.0 parts |

The resulting latex was then stripped of residual monomer.

Latex A and B and a number of commercial available latices were compounded to provide a paper coating formula. The compound comprised:

| | |
|---|---|
| SPS Clay | 100 parts |
| Latex | 10 parts |
| Dispersant (Dispex-N-40) | .25 parts |
| Thickener | 1 part |
| Caustic soda | .18 parts |

The compound was adjusted to 59% solids and a pH of 8.

The paper was coated at 12 g of compound/m² using a hand coater. "Provincial" type paper was used as a base paper for binding power. The coated paper was dried at 130° C. for 60 seconds and conditioned overnight at 23° C., 50% relative humidity. The sheets were callandered twice on each side. at 60° C. and 3000 kgf. The sheets were then conditioned an additional 4 hours.

In the tests the gloss was measured on a Gardner PG 500 glossmeter. The brightness was measured on an Elrepho reflectance photometer. Ink absorbency was measured using a K & N test. Wet and dry pick were measured using 3804 Lorilleux ink at 300 cm/sec. and 30 cm/sec. using an AlC2 pick tester.

The paper stiffness was measured using a Kodak Pathe tester and a dynamic test (AFNOR NF 00 3025). 10 strips 150 mm long and 15 mm wide were tested in the direction of coating. The results of the testing are set forth on the table below.

As a comparison a series of commercially available latices suitable for use in paper coating compositions were compounded in the same formulation and tested in the same manner. The results are recorded in Table 1.

TABLE 1

| Latex | A | B | PL928* | PL1212* | Acrylate Latex (Acronal 320D) |
|---|---|---|---|---|---|
| Gloss | 75.6 | 72.3 | 74.7 | 78.1 | 75.8 |
| K & N | 12.9 | 13.2 | 12.4 | 15.3 | 17 |
| Dry Pick 3804-300 | 174 | 128 | 210 | 93 | 93 |
| Wet Pick 3804-30 | 1.37 | 1.30 | .98 | 1.31 | 1.13 |

*Trademark

What is claimed is:

1. A latex comprising from about 30 to 65 weight percent of heterogeneous particles comprising:

(A) from about 40 to 60 weight percent of a first domain formed by emulsion polymerization of a monomeric mixture consisting of (i) from about 45 to 65 weight percent of a $C_{8-12}$ vinylaromatic monomer which may be unsubstituted or substituted by a $C_{1-4}$ alkyl or alkanol radical or a bromine or chlorine atom;

(ii) from about 35 to about 50 weight percent of a $C_{4-9}$ aliphatic conjugated diolefin;

(iii) from about 0.5 to about 5 weight percent of at least one $C_{3-9}$ ethylenically unsaturated carboxylic acid; and (iv) from 0 to about 5 weight percent of an amide of the formula

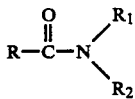

wherein R is an alkenyl radical of up to about 9 carbon atoms, $R_1$ may be hydrogen, or a $C_{1-4}$ alkyl or alkanol radical and $R_2$ may be hydrogen or a $C_{1-4}$ alkyl radical; and (B) from about 60 to 40 weight percent of a second domain formed by emulsion polymerization of a monomeric mixture consisting of:

(i) from about 40 to about 60 weight percent of a $C_{8-12}$ vinylaromatic monomer which may be unsubstituted or substituted by a $C_{1-4}$ alkyl or alkanol radical or a chlorine or bromine atom;

(ii) from about 30 to about 40 weight percent of a conjugated diolefin;

(iii) from about 0.5 to about 5 weight percent of at least one $C_{3-9}$ ethylenically unsaturated acid;

(iv) from about 0.5 to about 5 weight percent of an amide of the formula

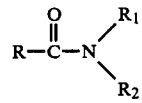

wherein R is an alkenyl radical of up to 7 carbon atoms, $R_1$ is hydrogen or a $C_{1-4}$ alkyl or alkanol radical, and $R_2$ is hydrogen or a $C_{1-4}$ alkyl radical; and (v) from about 3 to about 8 weight percent of an alkenyl nitrile containing up to 6 carbon atoms.

2. A latex according to claim 1 wherein in said first and second domains (i) said vinylaromatic monomer is selected from the group styrene, a-methyl styrene, p-methyl styrene, chlorostyrene, and bromostyrene;

(ii) said conjugated diolefin is selected from the group 1,3-butadiene and isoprene;

(iii) said ethylenically unsaturated acid is selected from the group acrylic acid, methacrylic acid, fumaric acid, and itaconic acid; and in said second domain (iv) said amide is selected from the group acrylamide, methacrylamide, N-methylolacrylamide and N-methylol methacrylamide; and (v) said nitrile is acrylonitrile.

* * * * *